United States Patent
Wu et al.

(10) Patent No.: US 7,190,654 B2
(45) Date of Patent: Mar. 13, 2007

(54) DISC BURNER AND ITS CONTROL METHOD

(75) Inventors: Guo-Zua Wu, Hsinchu (TW); Chien-Hsin Huang, Hsinchu (TW); Zu-Wen Chao, Hsinchu (TW); Chwan-Chan Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 531 days.

(21) Appl. No.: 10/838,255

(22) Filed: May 5, 2004

(65) Prior Publication Data
US 2005/0141386 A1 Jun. 30, 2005

(30) Foreign Application Priority Data
Dec. 26, 2003 (TW) .............................. 92137223 A

(51) Int. Cl.
*G11B 7/00* (2006.01)

(52) U.S. Cl. ..................................... 369/84; 369/47.33

(58) Field of Classification Search .................. 369/83, 369/84, 47.32, 47.33, 47.34, 47.1
See application file for complete search history.

(56) References Cited

U.S. PATENT DOCUMENTS
6,678,227 B1 * 1/2004 Kondo et al.
2002/0141142 A1 10/2002 Rookes

FOREIGN PATENT DOCUMENTS
EP 1267459 A1 12/2002

\* cited by examiner

*Primary Examiner*—Nabil Hindi
(74) *Attorney, Agent, or Firm*—Birch, Stewart, Kolasch & Birch, LLP

(57) ABSTRACT

A disc burner and its control method applicable to high speed disc burner, to solve disc burning failure problem due to burning speed exceeding encoding speed. A buffer is inserted to store the encoded data in groups, and these data groups are used in sequence for disc burning purpose. Therefore, the waiting time of the writing laser is spread out and does not exceed the threshold waiting time, and there is no disc burning failure problem.

10 Claims, 1 Drawing Sheet

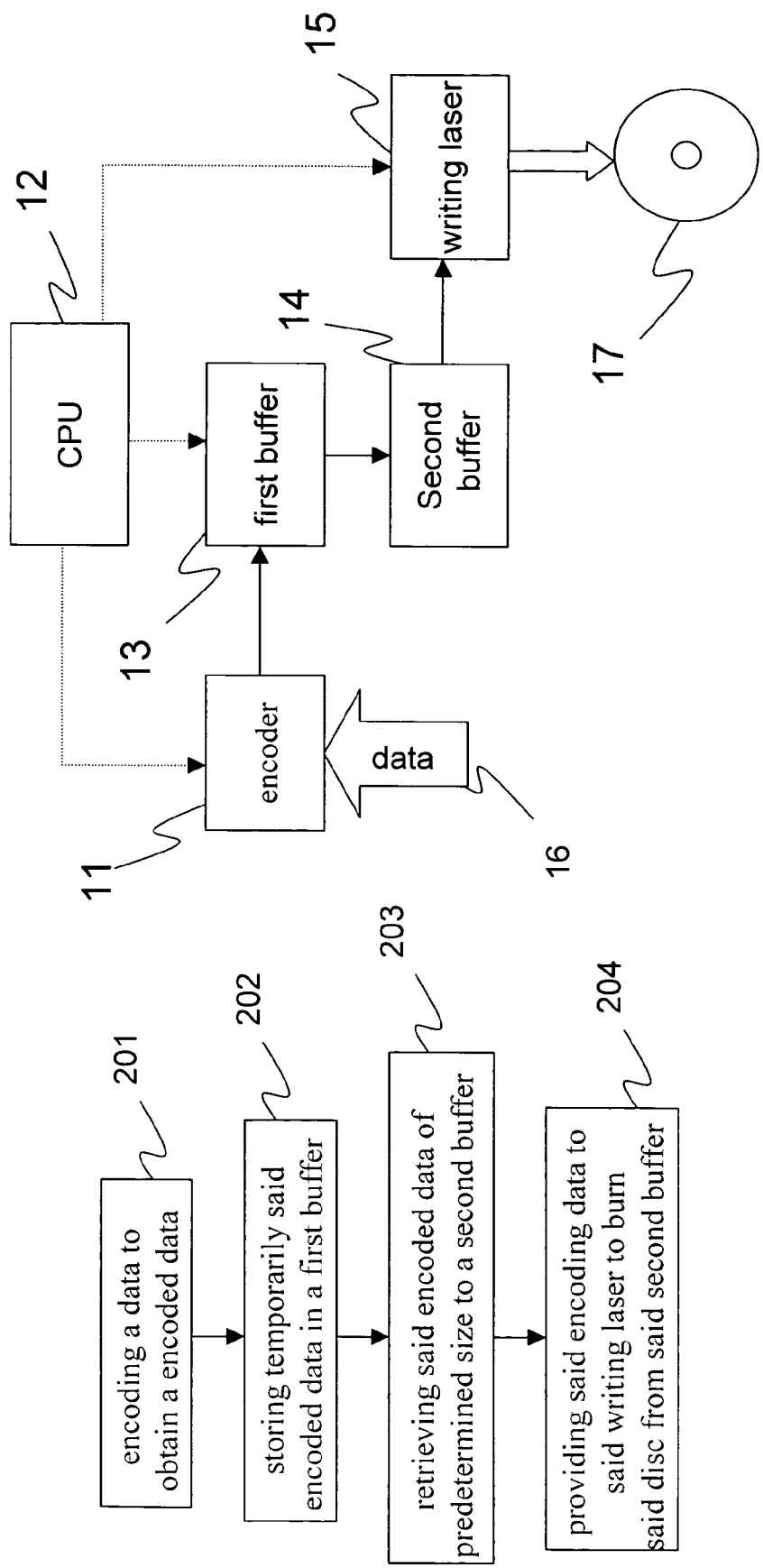

DISC BURNER AND ITS CONTROL METHOD

This Non-provisional application claims priority under 35 U.S.C. § 119(a) on Patent Application No(s). 092137223 filed in Taiwan on Dec. 26, 2003, the entire contents of which are hereby incorporated by reference.

BACKGROUND OF THE INVENTION

1. Field of Invention

The present invention relates to a disc burner and its control method, applicable to an optical burning system, especially to high speed disc drives.

2. Related Art

As technology has advanced, recordable and rewritable optical discs have replaced the traditional recording media and have become the main stream of data storage devices. As disc burners become more popular, recordable and rewritable optical discs have become necessities. The early era burners are limited by burning speed, and their practicality has been questioned. In recent years, the burning speed of burners has increased continuously and recordable and rewritable optical discs have become important storage media.

However, although burning speed has increased, encoding speed of video and audio data has not been improved as much in comparison. Data encoding speed and burning speed were similar at the early era, so that there was no problem to record data onto the discs correctly. However, since the burning speed greatly exceeds the data encoding speed, there is a problem when the burner's writing laser does not have any data to write onto the disc.

To compensate for this situation, the writing laser would automatically write in a set of "1111" filler code. However, if the filler code is too long, temporary pauses will be formed in the data or during video and audio playback, so the burning process fails. Therefore, the wait time (or the filler code) has a calculated threshold; during the burning process, the wait time should not exceed the threshold value. However, current high speed burners do not provide a corresponding support device, there is a high probability of burning process failures. For example, for a 4 Mbps video and audio source, only the 4.32 Mbps CD burner can be used, not the 11.06 Mbps's DVD burner; this is very inconvenient.

SUMMARY OF THE INVENTION

To solve the described problem, the invention reveals a disc burner and its control method, which solves the known disc burner's failure problem, caused by burning speed exceeding encoding speed, and increases the application area of the burner The disc burner and its control method revealed by the invention transmits the encoded data in groups to the writing laser for burning, to spread out the waiting time because of the difference in speed. So none of the waiting time periods exceeds the threshold waiting time, and no burning failure occurs. The actual hardware structure has two buffers, where one is connected to the encoder to store the encoded data, and the other buffer located between the first buffer and the writing laser is used to divide the encoded data into groups for the writing laser to burn the data onto discs. Therefore, the waiting time of the writing laser is spread out and does not exceed the threshold waiting time, and there is no disc burning failure problem.

Further scope of applicability of the present invention will become apparent from the detailed description given hereinafter. However, it should be understood that the detailed description and specific examples, while indicating preferred embodiments of the invention, are given by the way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus is not limitative of the present invention, wherein:

FIG. 1 illustrates the flow diagram of the invention.

FIG. 2 illustrates the structure of the invention.

DETAILED DESCRIPTION OF THE INVENTION

According to the disc burner and its control method revealed by the invention, it groups the data waiting to be burned into small groups for the writing laser to record, so it is constantly working. Although the number of waiting periods has increased, however, each waiting time is spread out by burning in groups, so they are all shortened and will not exceed the threshold waiting time, so the burning process will not fail due to this reason.

The method is shown in FIG. 1, and the structure is illustrated by FIG. 2. It comprises of the encoder 11, central processing unit (CPU) 12, first buffer 13, second buffer 14, and writing laser 15. The major operations are all controlled by the central processing unit 12. The encoder 11, first buffer 13, second buffer 14, and writing laser 15 are connected in this order.

First, encode the data 16 to be burned using the encoder 11 (step 201), then use the first buffer 13 to store these encoded data (step 202). Then transfer the encoded data to the second storage area 14 (step 203), and the writing laser 15 can only record the data in the second buffer 14 (step 204), and burns the encoded data of predetermined size onto the disc 17.

Therefore, the key point is to determine the predetermined size for the transmitting encoded data size. First, if the encoder 11's encoding speed is $V_1$, the writing laser 15's burning speed is $V_2$, and then the allowed threshold waiting time for this burner is $T_L$. When the predetermined encoded data size is D1, then the burning time for the writing laser 14 is $D1/V_2$. After waiting for a period of time (allowing the encoder 11 to refill the encoded data quantity), encoded data of the predetermined size is transferred from the first buffer 12 to the second buffer 13, and then allowing the writing laser 15 to record data onto a disc 17. Comparing to $V_1$ and $V_2$, the transmission time is a lot shorter, so it is ignored. Since the threshold time of the burner is $T_L$, then the waiting time forth mentioned is set to the threshold time $T_L$, and the following formula is obtained: $D1=V_1 * (D1/V_2+T_L)$ In other words, the encoder 11 must encode the required predetermined size data for burning within the time period of the burning time of the writing laser 15 plus the waiting time (predetermined to the threshold waiting time $T_L$), so the following formula is obtained:

$$D1=T_L/((1/V_1)-(1/V_2)).$$

This is how the predetermined coding data size for threshold is obtained. As long as the first buffer 13 transmits D1 amount of data in time period $T_L$ to the second buffer 14, it is guaranteed that the waiting time of the writing laser 15 is not too long.

In practice, since the described method results in frequent data transmissions between first buffer 13 and second buffer 14, a lot of unnecessary resources are wasted. Another method is to transmit N times the predetermined coding data size D1 at the same time to the second buffer 14, then the second buffer 14 divides up the data and transmits them in N times to the writing laser 14 to burn onto the disc 17, and achieves a more efficient result.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc control method, used to control a writing laser burning a disc, comprises of the following steps:
    encoding a data to obtain an encoded data;
    storing temporarily said encoded data in a first buffer;
    retrieving said encoded data of predetermined size to a second buffer; and
    providing said encoding data to said writing laser to burn said disc from said second buffer.

2. The optical disc burner control method as described in claim 1, wherein said predetermined size is determined from said data encoding speed and said writing laser burning speed.

3. The optical disc burner control method as described in claim 2, wherein said predetermined size is $T_L/((1/V_1)-(1/V_2))$, where $T_L$ is said optical disc burner's threshold waiting time, $V_1$ is said data encoding speed, and $V_2$ is said writing laser burning speed.

4. The optical disc burner control method as described in claim 1, wherein said step of providing said encoding data to said writing laser to burn said disc from said second buffer also comprises of dividing encoded data of said predetermined size into several portions for said writing laser to burn.

5. A laser disc burner, used to control a writing laser burning a disc, comprises of:
    an encoder, used to encode a data to form an encoded data;
    a first buffer, connected to said encoder, used to store said encoded data that is divided into several predetermined sized encoded data;
    a second buffer, connected to said first buffer, receiving said encoded data of predetermined size from said first buffer; and
    a writing laser, connected to said second buffer, used to burn said encoded data of predetermined size onto said disc.

6. The optical disc burner as described in claim 5, where in said first buffer is a buffer.

7. The optical disc burner as described in claim 5, where in said second buffer is a buffer.

8. The optical disc burner as described in claim 5, where in said predetermined size is determined from said data encoding speed and said writing laser burning speed.

9. The optical disc burner as described in claim 5, where in said predetermined size is $T_L/((1/V_1)-(1/V_2))$, where $T_L$ is said optical disc burner's threshold waiting time, $V_1$ is said data encoding speed, and $V_2$ is said writing laser burning speed.

10. The optical disc burner as described in claim 5, where in said second buffer transmits said encoded data of predetermined size in groups to said writing laser.

* * * * *